(12) United States Patent
Moreau et al.

(10) Patent No.: US 10,848,830 B2
(45) Date of Patent: *Nov. 24, 2020

(54) CONTEXTUAL NAVIGATIONAL CONTROL FOR DIGITAL TELEVISION

(71) Applicant: Comcast Cable Communications Management, LLC, Philadelphia, PA (US)

(72) Inventors: Samuel Moreau, Bellevue, WA (US); John Carney, Sausalito, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,160

(22) Filed: May 1, 2018

(65) Prior Publication Data

US 2019/0110108 A1    Apr. 11, 2019
US 2020/0296471 A9    Sep. 17, 2020

Related U.S. Application Data

(63) Continuation of application No. 14/279,645, filed on May 16, 2014, now Pat. No. 9,992,546, which is a
(Continued)

(51) Int. Cl.
*H04N 21/20*       (2011.01)
*H04N 21/482*      (2011.01)
(Continued)

(52) U.S. Cl.
CPC ....... *H04N 21/482* (2013.01); *H04N 5/44543* (2013.01); *H04N 21/4312* (2013.01); *H04N 21/4314* (2013.01)

(58) Field of Classification Search
None
See application file for complete search history.

(56) References Cited

U.S. PATENT DOCUMENTS 5,287,489 A    2/1994  Nimmo et al.
5,321,750 A    6/1994  Nadan
(Continued)

FOREIGN PATENT DOCUMENTS

EP    0624039 A2    11/1994
EP    0963115 A1    12/1999
(Continued)

OTHER PUBLICATIONS

Andreas Kraft and Klaus Hofrichter, "An Approach for Script-Based Broadcast Application Production", Springer-Verlag Berlin Heidelberg, pp. 74-82, 1999.
(Continued)

*Primary Examiner* — Cai Y Chen
(74) *Attorney, Agent, or Firm* — Banner & Witcoff, Ltd.

(57) ABSTRACT

A contextual navigational control for digital television is described. An apparatus, comprises a contextual navigation control interface (CNCI). The CNCI includes a first area that represents a plurality of cable television programs having a first level of relevance. A second area represents a first group of the plurality of programs having a second level of relevance. A third area represents a first subgroup of the first group having a third level of relevance. A fourth area represents a second subgroup of the first group having a fourth level of relevance. There may be additional areas representing additional sub-groups of relevance to the current viewing context.

28 Claims, 7 Drawing Sheets

Related U.S. Application Data continuation of application No. 10/925,737, filed on Aug. 24, 2004, now Pat. No. 8,819,734, which is a continuation-in-part of application No. 10/664,275, filed on Sep. 16, 2003, now Pat. No. 7,703,116.

(60) Provisional application No. 60/552,998, filed on Mar. 11, 2004.

(51) Int. Cl.
    *H04N 5/445* (2011.01)
    *H04N 21/431* (2011.01)

(56) References Cited

U.S. PATENT DOCUMENTS

| | | | |
|---|---|---|---|
| 5,353,121 A | 10/1994 | Young et al. | |
| 5,485,221 A | 1/1996 | Banker et al. | |
| 5,521,841 A | 5/1996 | Arman et al. | |
| 5,530,939 A | 6/1996 | Mansfield, Jr. et al. | |
| 5,583,563 A | 12/1996 | Wanderscheid et al. | |
| 5,589,892 A | 12/1996 | Knee et al. | |
| 5,592,551 A | 1/1997 | Lett et al. | |
| 5,594,509 A * | 1/1997 | Florin | H04N 5/4403 348/565 |
| 5,613,057 A | 3/1997 | Caravel | |
| 5,621,456 A | 4/1997 | Florin et al. | |
| 5,657,072 A | 8/1997 | Aristides et al. | |
| 5,659,793 A | 8/1997 | Escobar et al. | |
| 5,666,645 A | 9/1997 | Thomas et al. | |
| 5,675,752 A | 10/1997 | Scott et al. | |
| 5,694,176 A | 12/1997 | Bruette et al. | |
| 5,737,552 A | 4/1998 | Lavallee et al. | |
| 5,802,284 A | 9/1998 | Karlton et al. | |
| 5,826,102 A | 10/1998 | Escobar et al. | |
| 5,844,620 A | 12/1998 | Coleman et al. | |
| 5,850,218 A | 12/1998 | LaJoie et al. | |
| 5,852,435 A | 12/1998 | Vigneaux et al. | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt et al. | |
| 5,905,492 A | 5/1999 | Straub et al. | |
| 5,929,849 A | 7/1999 | Kikinis | |
| 5,945,987 A | 8/1999 | Dunn | |
| 5,960,194 A | 9/1999 | Choy et al. | |
| 5,990,890 A | 11/1999 | Etheredge | |
| 5,996,025 A | 11/1999 | Day et al. | |
| 6,002,394 A | 12/1999 | Schein et al. | |
| 6,005,561 A | 12/1999 | Hawkins et al. | |
| 6,008,083 A * | 12/1999 | Brabazon | H01L 28/40 257/E21.008 |
| 6,008,803 A * | 12/1999 | Rowe | G06F 3/0482 348/E5.105 |
| 6,008,836 A | 12/1999 | Bruck et al. | |
| 6,016,144 A | 1/2000 | Blonstein et al. | |
| 6,025,837 A | 2/2000 | Matthews, III et al. | |
| 6,038,560 A | 3/2000 | Wical | |
| 6,049,823 A | 4/2000 | Hwang | |
| 6,061,695 A | 5/2000 | Slivka et al. | |
| 6,067,108 A | 5/2000 | Yokote et al. | |
| 6,088,722 A | 7/2000 | Herz et al. | |
| 6,091,411 A | 7/2000 | Straub et al. | |
| 6,094,237 A | 7/2000 | Hashimoto | |
| 6,141,003 A | 10/2000 | Chor et al. | |
| 6,148,081 A | 11/2000 | Szymanski et al. | |
| 6,162,697 A | 12/2000 | Singh et al. | |
| 6,169,543 B1 | 1/2001 | Wehmeyer | |
| 6,172,677 B1 | 1/2001 | Stautner et al. | |
| 6,177,931 B1 | 1/2001 | Alexander et al. | |
| 6,191,781 B1 | 2/2001 | Chaney et al. | |
| 6,195,692 B1 | 2/2001 | Hsu | |
| 6,205,582 B1 | 3/2001 | Hoarty | |
| 6,219,839 B1 | 4/2001 | Sampsell | |
| 6,239,795 B1 | 5/2001 | Ulrich et al. | |
| 6,240,555 B1 | 5/2001 | Shoff et al. | |
| 6,281,940 B1 | 8/2001 | Sciammarella | |
| 6,292,187 B1 | 9/2001 | Gibbs et al. | |
| 6,292,827 B1 | 9/2001 | Raz | |
| 6,295,057 B1 | 9/2001 | Rosin et al. | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 | 7/2002 | Kamen et al. | |
| 6,426,779 B1 | 7/2002 | Noguchi et al. | |
| 6,442,755 B1 | 8/2002 | Lemmons et al. | |
| 6,477,705 B1 | 11/2002 | Yuen et al. | |
| 6,486,920 B2 | 11/2002 | Arai et al. | |
| 6,522,342 B1 | 2/2003 | Gagnon et al. | |
| 6,529,950 B1 | 3/2003 | Lumelsky et al. | |
| 6,530,082 B1 | 3/2003 | Del Sesto et al. | |
| 6,532,589 B1 | 3/2003 | Proehl et al. | |
| 6,564,263 B1 | 5/2003 | Bergman et al. | |
| 6,567,104 B1 | 5/2003 | Andrew et al. | |
| 6,571,392 B1 | 5/2003 | Zigmond et al. | |
| 6,591,292 B1 | 7/2003 | Morrison et al. | |
| 6,621,509 B1 | 9/2003 | Eiref et al. | |
| 6,636,887 B1 | 10/2003 | Augeri | |
| 6,658,661 B1 | 12/2003 | Arsenault et al. | |
| 6,678,891 B1 | 1/2004 | Wilcox et al. | |
| 6,684,400 B1 | 1/2004 | Goode et al. | |
| 6,698,020 B1 | 2/2004 | Zigmond et al. | |
| 6,704,359 B1 | 3/2004 | Bayrakeri et al. | |
| 6,731,310 B2 | 5/2004 | Craycroft et al. | |
| 6,745,367 B1 | 6/2004 | Bates et al. | |
| 6,760,043 B2 | 7/2004 | Markel | |
| 6,763,522 B1 | 7/2004 | Kondo et al. | |
| 6,766,526 B1 | 7/2004 | Ellis | |
| 6,806,887 B2 | 10/2004 | Chernock et al. | |
| 6,857,128 B1 | 2/2005 | Borden, IV et al. | |
| 6,886,029 B1 | 4/2005 | Pecus et al. | |
| 6,904,610 B1 | 6/2005 | Bayrakeri et al. | |
| 6,910,191 B2 | 6/2005 | Segerberg et al. | |
| 6,918,131 B1 | 7/2005 | Rautila et al. | |
| 7,028,327 B1 | 4/2006 | Dougherty et al. | |
| 7,065,785 B1 | 6/2006 | Shaffer et al. | |
| 7,080,400 B1 | 7/2006 | Navar | |
| 7,103,904 B1 | 9/2006 | Blackketter et al. | |
| 7,114,170 B2 | 9/2006 | Harris et al. | |
| 7,134,072 B1 | 11/2006 | Lovett et al. | |
| 7,152,236 B1 | 12/2006 | Wugofski et al. | |
| 7,162,694 B2 | 1/2007 | Venolia | |
| 7,162,697 B2 | 1/2007 | Markel | |
| 7,174,512 B2 | 2/2007 | Martin et al. | |
| 7,177,861 B2 | 2/2007 | Tovinkere et al. | |
| 7,197,715 B1 | 3/2007 | Valeria | |
| 7,207,057 B1 | 4/2007 | Rowe | |
| 7,213,005 B2 | 5/2007 | Mourad et al. | |
| 7,221,801 B2 | 5/2007 | Jang et al. | |
| 7,237,252 B2 | 6/2007 | Billmaier | |
| 7,293,275 B1 | 11/2007 | Krieger et al. | |
| 7,305,696 B2 | 12/2007 | Thomas et al. | |
| 7,313,806 B1 | 12/2007 | Williams et al. | |
| 7,337,457 B2 | 2/2008 | Pack et al. | |
| 7,360,232 B2 | 4/2008 | Mitchell | |
| 7,363,612 B2 | 4/2008 | Satuloori et al. | |
| 7,406,705 B2 | 7/2008 | Crinon | |
| 7,440,967 B2 | 10/2008 | Chidlovskii | |
| 7,464,344 B1 | 12/2008 | Carmichael et al. | |
| 7,472,137 B2 | 12/2008 | Edelstein et al. | |
| 7,490,092 B2 | 2/2009 | Sibley et al. | |
| 7,516,468 B1 | 4/2009 | Deller et al. | |
| 7,523,180 B1 | 4/2009 | DeLuca et al. | |
| 7,587,415 B2 | 9/2009 | Gaurav et al. | |
| 7,624,416 B1 | 11/2009 | Vandermolen et al. | |
| 7,640,487 B2 | 12/2009 | Amielh-Caprioglio et al. | |
| 7,702,315 B2 | 4/2010 | Engstrom et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 7,752,258 B2 | 7/2010 | Lewin et al. | |
| 7,805,746 B2 | 9/2010 | Brandyberry et al. | |

(56) References Cited

U.S. PATENT DOCUMENTS

| | | |
|---|---|---|
| 7,818,667 B2 | 10/2010 | Adams |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,042,132 B2 | 10/2011 | Carney et al. |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,352,983 B1 | 1/2013 | Chane et al. |
| 8,365,230 B2 | 1/2013 | Chane et al. |
| 8,381,259 B1 | 2/2013 | Khosla |
| 8,413,205 B2 | 4/2013 | Carney et al. |
| 8,416,952 B2 | 4/2013 | Moreau et al. |
| 8,434,109 B2 | 4/2013 | Kamimaeda et al. |
| 8,448,208 B2 | 5/2013 | Moreau et al. |
| 8,578,411 B1 | 11/2013 | Carney et al. |
| 8,660,545 B1 | 2/2014 | Redford et al. |
| 8,699,862 B1 | 4/2014 | Sharifi et al. |
| 8,707,354 B1 | 4/2014 | Moreau et al. |
| 8,745,658 B2 | 6/2014 | Carney et al. |
| 8,756,634 B2 | 6/2014 | Chane et al. |
| 8,793,256 B2 | 7/2014 | McIntire et al. |
| 8,819,734 B2 | 8/2014 | Moreau et al. |
| 8,850,480 B2 | 9/2014 | Chane et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,112,623 B2 | 8/2015 | Blaxland |
| 9,197,938 B2 | 11/2015 | Chane et al. |
| 9,363,560 B2 | 6/2016 | Moreau et al. |
| 9,414,022 B2 | 8/2016 | Adams |
| 9,451,196 B2 | 9/2016 | Carney et al. |
| 9,473,548 B1 | 10/2016 | Chakrovorthy et al. |
| 9,516,253 B2 | 12/2016 | De Andrade et al. |
| 9,553,927 B2 | 1/2017 | Sharma et al. |
| 9,729,924 B2 | 8/2017 | Moreau et al. |
| 9,967,611 B2 | 5/2018 | Andrade et al. |
| 9,992,546 B2 | 6/2018 | Moreau et al. |
| 10,110,973 B2 | 10/2018 | Adams |
| 10,149,014 B2 | 12/2018 | Chane et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz |
| 2003/0005444 A1 | 1/2003 | Crinon et al. |
| 2003/0005453 A1 | 1/2003 | Rodriguez et al. |
| 2003/0014752 A1 | 1/2003 | Zaslaysky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |

(56) References Cited

U.S. PATENT DOCUMENTS

| | | |
|---|---|---|
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0105793 A1 | 5/2006 | Gutowski et al. |
| 2006/0125962 A1 | 6/2006 | Shelton et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddaramappa et al. |
| 2007/0064715 A1 | 3/2007 | Lloyd et al. |
| 2007/0112761 A1 | 5/2007 | Xu et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301732 A1 | 12/2008 | Archer et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0054811 A1 | 3/2012 | Spears |
| 2012/0117151 A1 | 5/2012 | Bill |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0347018 A1 | 12/2013 | Limp et al. |

(56) References Cited

U.S. PATENT DOCUMENTS

| | | |
|---|---|---|
| 2013/0347030 A1 | 12/2013 | Oh et al. |
| 2014/0006951 A1 | 1/2014 | Hunter |
| 2014/0009680 A1 | 1/2014 | Moon et al. |
| 2014/0032473 A1 | 1/2014 | Enoki et al. |
| 2014/0068648 A1 | 3/2014 | Green et al. |
| 2014/0075465 A1 | 3/2014 | Petrovic et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0359662 A1 | 12/2014 | Packard et al. |
| 2014/0365302 A1 | 12/2014 | Walker |
| 2014/0373032 A1 | 12/2014 | Merry et al. |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 0011869 A1 | 3/2000 |
| WO | 0033576 A1 | 6/2000 |
| WO | 0110115 A1 | 2/2001 |
| WO | 0182613 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

Fernando Pereira, "The MPEG-4 Book", Prentice Hall, Jul. 10, 2002.

Michael Adams, "Open Cable Architecture", Cisco Press, Dec. 3, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

Shim, et al., "A SMIL Based Graphical Interface for Interactive TV", Internet Tech. Laboratory Dept. of Comp. Engineering, San Jose State University, pp. 257-266, 2003.

Yoon, et al., "Video Gadget: MPET-7 Based Audio-Visual Content Indexing and Browsing Engine", LG Electronics Institute of Technology, 2001, pp. 59-68.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

European Patent Application No. 09175979.5—Office Action dated Dec. 13, 2011.

Canadian Patent Application No. 2,685,833—Office Action dated Jan. 20, 2012.

Li, Y. et al. "Reliable Video Clock Time Recognition", Pattern Recognition, 2006, 1CPR 1006, 18th International Conference on Pattern Recognition, 4 pages.

European Search Report dated Mar. 1, 2010.

Salton et al., Computer Evaluation of Indexing and Text Processing Journal of the Association for Computing Machinery, vol. 15, No. 1, Jan. 1968, pp. 8-36.

Smith, J.R. et al., An Image and Video Search Engine for the World-Wide Web Storage and Retrieval for Image and Video Databases 5, San Jose, Feb. 13-14, 1997, Proceedings of Spie, Belingham, Spie, US, vol. 3022, Feb. 13, 1997, pp. 84-95.

Kontothoanassis, Ledonias et al. "Design, Implementation, and Analysis of a Multimedia Indexing and Delivery Server", Technical Report Series, Aug. 1999, Cambridge Research Laboratory.

Messer, Alan et al., "SeeNSearch: A context Directed Search Facilitator for Home Entertainment Devices", Paper, Samsung Information Systems America Inc., San Jose, CA, 2008.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Steffan Staab et al., "Semantic Multimedia", Reasoning Web; Lecture Notes in Computer Science, pp. 125-170, Sep. 2008.

European Search Report for Application No. 09180776.8, dated Jun. 7, 2010, 9 pages.

European Search Report, EP 09 18 0762, completion date Mar. 22, 2010.

European Search Report dated Jun. 4, 2010.

EP Application No. 09 179 987.4-1241—Office Action dated Feb. 15, 2011.

European Application No. 09 175 979.5—Office Action dated Apr. 11, 2011.

Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.

Extended European Search Report—EP14159227.9—dated Sep. 3, 2014.

Canadian Office Action—CA 2,685,833—dated Jan. 22, 2015.

European Extended Search Report—EP 13192112.4—dated May 11, 2015.

CA Response to Office Action—CA Appl. 2,685,833—dated Jul. 17, 2015.

Response to European Office Action—European Appl. 13192112.4—dated Dec. 9, 2015.

CA Office Action—CA App 2,685,833—dated Jan. 27, 2016.

European Office Action—EP App 14159227.9—dated Jul. 12, 2016.

Agnieszka Zagozdzinnska et al. "Tridaq Systems in HEP Experiments at LHC Accelerator" Kwartalnik Elektroniki I Telekomunikacji, vol. 59, No. 4, Oct. 2013.

CA Office Action—CA Application 2685833—dated Feb. 8, 2017.

Nov. 29, 2017—Canadian Office Action—CA 2,685,833.

Feb. 19, 2018—European Summons to Oral Proceedings—EP 14159227.9.

Mar. 9, 2018—European Office Action—EP 13192112.4.

Jul. 31, 2018—European Decision to Refuse—14159227.9.

(56) References Cited

OTHER PUBLICATIONS

Sep. 5, 2019—Canadian Office Action—CA 2,685,833.
Nov. 6, 2019—Canadian Office Action—CA 2,832,800.
U.S. Appl. No. 12/274,452, Method and Apparatus for Delivering Video and Video Related Content as Sub-Asset Level, filed Nov. 20, 2008.
U.S. Appl. No. 10/306,752, Broadcast Database, filed Nov. 27, 2002.
U.S. Appl. No. 10/635,799, User Customization of User Interfaces for Interactive Television, filed Aug. 5, 2003.
U.S. Appl. No. 13/826,090, Content Event Messaging, filed Mar. 14, 2013.
U.S. Appl. No. 13/671,626, Crowdsourcing Supplemental Content, filed Nov. 8, 2012.
U.S. Appl. No. 13/771,592, System and Method for Construction, Delivery and Display of iTV Content, filed Feb. 20, 2013.
U.S. Appl. No. 13/803,274, Providing Supplemental Content, filed Mar 14, 2013.
U.S. Appl. No. 13/795,792, Channel Family Surf Control, filed Mar. 12, 2013.
U.S. Appl. No. 14/013,290, Graphically Rich, Modular, Promotional Tile Interface for Interactive Television, filed Aug. 29, 2013.
U.S. Appl. No. 14/039,734, System and Method for Controlling iTV Application Behaviors through the Use of Application Profile Filters, filed Sep. 27, 2013.
U.S. Appl. No. 14/520,819, Systems and Methods for Curating Content Metadata, filed Oct. 22, 2014.
U.S. Appl. No. 14/842,196, System and Method for Construction, Delivery and Display of iTV Content, filed Sep. 1, 2015.
U.S. Appl. No. 15/639,386, System and Method for Construction, Delivery and Display of iTV Applications that Blend Programming Information of On-Demand and Broadcast Service Offerings, filed Jun. 30, 2017.
U.S. Appl. No. 15/909,123, Prioritized Placement of Content Elements for iTV Applications, filed Mar. 1, 2018.
U.S. Appl. No. 16/119,184, Validation of Content, filed Aug. 31, 2018.
U.S. Appl. No. 16/160,375, Interactive User Interface for Television Applications, filed Oct. 15, 2018.
U.S. Appl. No. 16/189,605, System and Method for Controlling iTV Application Behaviors Through the Use of Application Profile Filters, filed Nov. 13, 2018.
U.S. Appl. No. 16/251,467, System and Method for Blending Linear Content, Non-Linear Content, or Managed Content, filed Jan. 18, 2019.

* cited by examiner

FIG. 7

CONTEXTUAL NAVIGATIONAL CONTROL FOR DIGITAL TELEVISION

RELATED APPLICATIONS

The present application is a Continuation of and claims priority to U.S. patent application Ser. No. 14/279,645, filed May 16, 2014, which claims priority to U.S. Pat. No. 8,819,734, issued Aug. 26, 2014, which claims priority to U.S. Pat. No. 7,703,116, issued Apr. 20, 2010, which claims priority to U.S. Provisional Patent Application No. 60/552,998, filed Mar. 11, 2004, the disclosures of each of which are incorporated by reference herein in their entirety.

FIELD OF THE INVENTION

The present invention relates to systems and methods for presenting navigation and control of television viewing services.

BACKGROUND

Interactive television (iTV) is currently available in varying forms. At the core of iTV applications are the navigation applications provided to subscribers to assist in the discovery and selection of television programming. Currently available methods and systems for browsing and selecting broadcast (linear television) are known as interactive program guides (IPGs)—or electronic program guides (EPGs). Current IPGs allow the subscriber to browse and select linear broadcast programming. These IPGs also include the ability to subset the broadcast linear program listing data by subject or type of programming.

In addition to linear broadcast television, subscribers may now also be given opportunities to select from a list of programs that are not linear, but instead are provided on demand. Such technology is generally referred to as Video on Demand (VOD). The current schemes for browsing and selecting VOD programs include the ability to select such programming from categories of programming.

Due to advances in technologies such as data compression, system operators such as cable multiple system operators (MSOs) and satellite operators are able to send more and more broadcast channels and on-demand content over their systems. This in turn has prompted broadcast content providers and programmers to develop more and more channels and on-demand content offerings. Also, the addition of digital video recorder (DVR) technology to set-top boxes (STBs) now provide additional options for time-shifted viewing of broadcast TV and increasing options for the storage of VOD titles that have been purchased for viewing, or likely-to-purchase.

The current television navigational structure is predicated on the numeric channel lineup where a channel's position is determined arbitrarily for each MSO system and without regard for clustering content type or brand. To the TV viewer, this is also manifested in the grid-based navigational tools as they are generally structured in a time-by-channel grid format. As a navigational model, this has become outdated with the increasing number of channels (500+). The problem is further exacerbated with the addition of non-linear (non time-based) On-Demand and time-shifted (DVR) content and other interactive applications such as games.

With these increasing number of TV viewing options comes a complexity of navigating the options to find something to watch. There are generally two types of viewers. One type of viewer knows the type of content they want to watch and are searching for an instance of that type of content. This is exemplified by a viewer who, wanting to watch an action film, wishes to browse available action films. The second type of viewer is one that has no specific notion of what they want to watch—they just want to find something interesting to them in a more impulse oriented manner.

The current state of technology for browsing for TV content includes searching lists of content underneath category heading or browsing large lists or grids of data to find content, or typing in search criteria. Each of these browse methods are referred to in this document as content search points. Content search points include IPG's and EPG's, Movies-On-Demand applications, text search, DVR recorded shows listings, and Category Applications as specified in the above-cited patent application. Current technology also consists of menus and toolbars that allow one to jump to the various content search points. The problem with current technology is that due to the large amount of content on the Digital TV service, the menus and toolbars themselves are becoming either long lists of specific content that are difficult to search, or short lists of general categories that do not provide quick access to specific needs. Thus, the new features of digital television, new content types and the sheer volume of viewing options warrant a new navigational model for viewing television.

SUMMARY

A contextual navigational control for digital television is described. In one embodiment a contextual navigation control interface (CNCI) includes a first area that represents a plurality of cable television programs having a first level of relevance. A second area represents a first group of the plurality of programs having a second level of relevance. A third area represents a first subgroup of the first group having a third level of relevance. A fourth area represents a second subgroup of the first group having a fourth level of relevance. There may be additional areas representing additional sub-groups of relevance to the current viewing context.

BRIEF DESCRIPTION OF THE DRAWINGS

The present invention will be understood and appreciated more fully from the following detailed description taken in conjunction with the drawings in which.

DETAILED DESCRIPTION

The present invention provides, in various embodiments, systems and methods by which subscribers are presented with a dynamic navigational interface for linking to content. This dynamic navigational interface speeds access to content by providing a minimal graphical interface and by first presenting contextual options to the viewer that are relevant to the currently viewed program, channel, provider or genre of same. The contextual options are further divided in the user presentation along multiple levels or dimensions from general to more specific relative to the currently viewed content.

Described herein are systems and methods by which subscribers are presented with dynamic iTV navigational hierarchies that first present navigational options based on relevance to the available content on television, and to the currently viewed program, channel, provider or genre of program, channel or provider. In current navigational systems users are provided menus from which they can select a target content search point. These menus are either presented as long lists of options or as very short lists. The long lists provide greater subdivision of content but create a navigational obstacle in that the lists must be scanned to find a link to a specific content of interest. The short lists provide content search points that are much too general such that if the link is selected, the viewer is taken to yet another page for further categorization or the viewer is presented with a large set of content that must be browsed. The present invention enables the quick access to multiple levels of granularity of content categorization on a single menu, by using the context of the currently viewed program to set the state of the navigational control when displayed.

In the following description, for purposes of explanation, numerous specific details are set forth in order to provide a thorough understanding of the present invention. It will be evident, however, to one skilled in the art that the present invention may be practiced without these specific details. As one example, the terms subscriber, user, viewer are used interchangeably throughout this description. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, datum, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

An Exemplary Cable Television System

Figure 1:
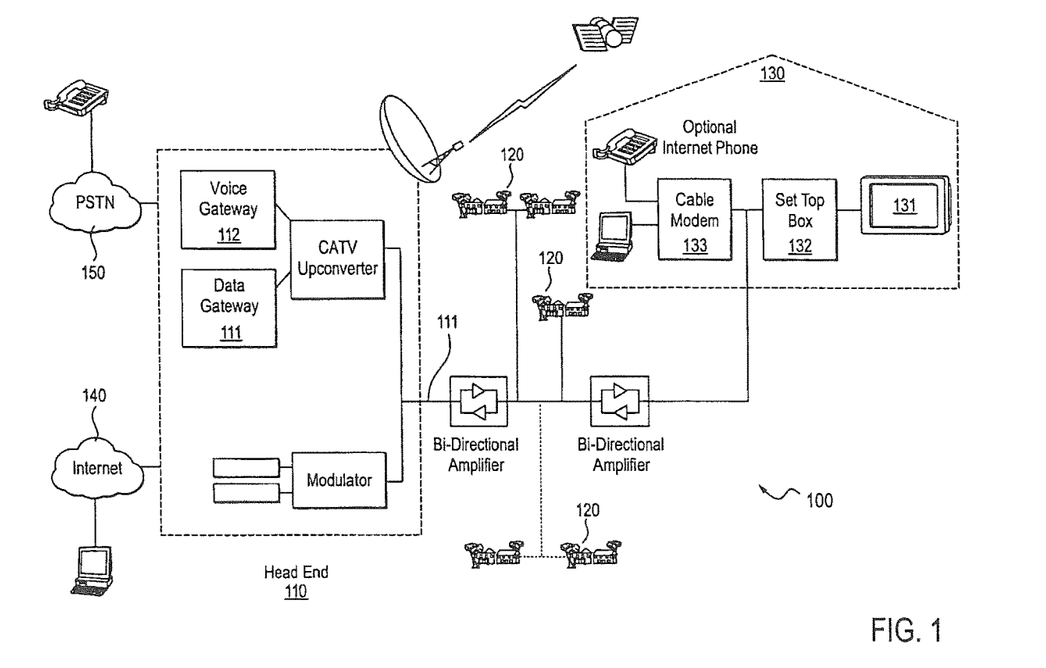
FIG. 1 illustrates an exemplary two-way cable television system that provides contextual navigational control for digital television, according to one embodiment of the present invention.

FIG. 1 illustrates an exemplary two-way cable television system that provides contextual navigational control for digital television, according to one embodiment of the present invention. Generally, cable television system (CATV) 100 provides video and data services through a network of high bandwidth coaxial cables and fibers. The cable system includes a head-end amplifier 110 that combines the broadcast and data signals for transmission to the subscribers. The head-end 110 is connected to fiber or coax trunks 111 that carry the signals into the neighborhoods 120 where they are tapped off to provide service to the residence 130.

The head-end 110 is the initial distribution center for a CATV system 100. The head-end 110 is where incoming video and television signal sources (e.g., video tape, satellites, local studios) are received, amplified and modulated onto TV carrier channels for transmission on the CATV cabling system. The cable distribution system is a cable (fiber or coax) that is used to transfer signals from the head-end 110 to the end-users. The cable is attached to the television 131 through a set-top box 132. The set-top box 132 adapts the signals from the head-end 110 to a format suitable for the television 131. Additionally, the set-top box 132 renders a user interface through which the end-user navigates through menus to select programming to view.

CATV system 100 allows two-way data transmission. Data is provided by a cable modem 133 in the residence 130 and data gateway (cable modem termination system (CMTS)) 111 at the head-end 110. The CMTS 111 also provides an interface to other networks such as the Internet 140. Furthermore, CATV system 100 allows cable telephony to initiate, process and receive voice communications. Telephony is provided by a voice gateway 112 at the head-end 110 that converts communication signals between data networks and telephone networks (e.g., PSTN) 150. The data and telephony attributes of CATV system 100 described above, are for the reader's benefit to appreciate the entire CATV system 100. However, the present system for contextual navigational control may be mainly associated with the digital television content delivery aspects of CATV system 100.

To further understand the present invention consider that all content has descriptive attributes. For example, the show "Sopranos" could be described by the following four attributes: HBO, Drama, Primetime, Crime. These attribute dimensions, namely Provider, Genre, Time of Day and Content are chosen purely for illustration, and additional categories or dimension could easily be identified. The type and number of attributes is variable and may be unique to an article of content. In the navigational model described by this invention, these attributes are the doorways to other content of interest based on the notion that what the viewer is watching has some basic attributes that are of interest to the viewer and can be predictive of where the viewer may wish to navigate.

Figure 2:
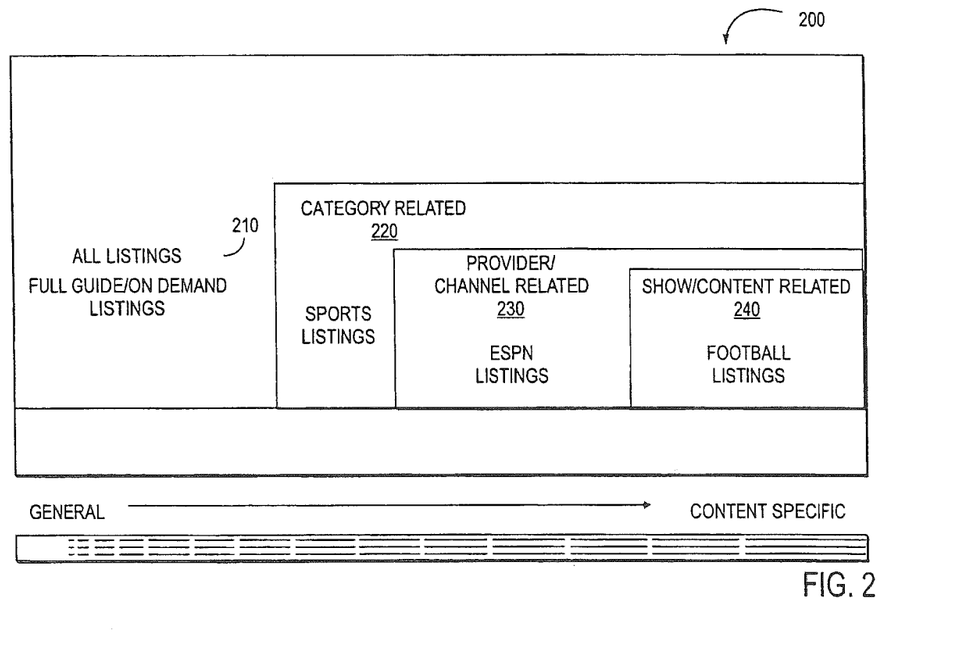
FIG. 2 illustrates four dimensions of programming contextual relevance, according to one embodiment of the present invention.

In one embodiment, the present contextual navigational control has four selection dimensions, or levels, with increasing contextual relevance to the currently broadcast program. FIG. 2 illustrates four dimensions of programming contextual relevance, according to one embodiment of the present invention. The four dimensions 200 or levels of navigation begin with the most general and proceed to the most content specific navigation that link context to the current content being viewed. These dimensions are:
 a All Listings (non-filtered) Related Links 210
 b Category Related Links 220
 c Channel/Provider Related Links 230
 d Show/Content Related Links 240

FIG. 2 illustrates how programming choices available to the viewer range from the most general or all programming choices, to filtered selections by content type (e.g. Sports), provider (e.g. ESPN), down to programming choices related to specific programming (e.g. a football game). Each contextual level of navigation from the most general to the most specific with respect to the current content, will now be described in detail.

Figure 3:
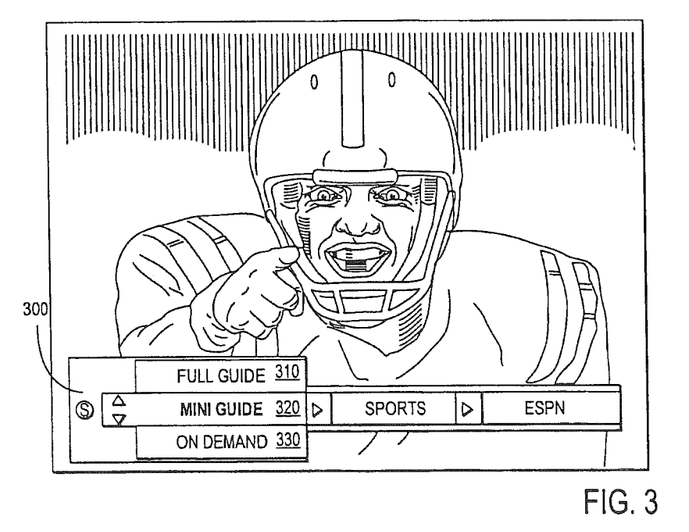
FIG. 3 illustrates an exemplary user interface for selecting the contextual navigation control mode, according to one embodiment of the present invention.
Figure 4:
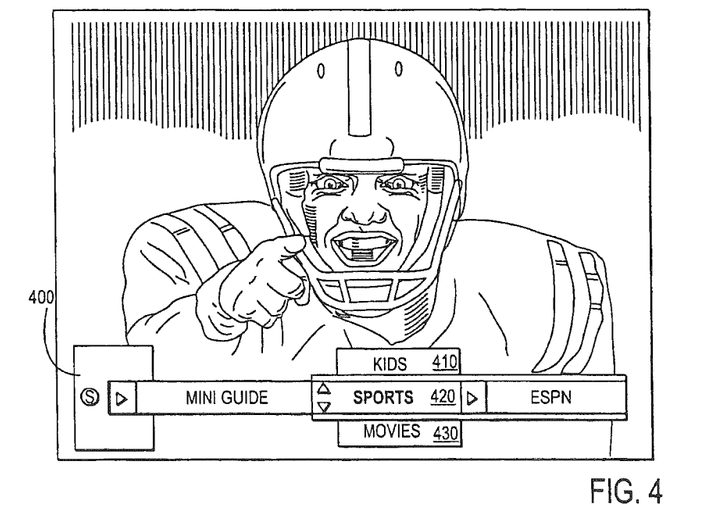
FIG. 4 illustrates an exemplary user interface 400 for selecting category related links, according to one embodiment of the present invention.

Level one (All Listings 210) represents the links to general system functions, in particular, it allows the user to select how he/she wishes to interact with the present contextual navigation control. FIG. 3 illustrates an exemplary user interface for selecting the contextual navigation control mode, according to one embodiment of the present invention. The control mode interface 300 includes the following viewing modes:
 1 Full Guide 310: Full Screen Guide of linear programming choices (either blocking video or with video inset)
 2 Mini-Guide 320: Overscreen guide to linear programming to allow for content selection with continued viewing of current programming
 3 On-Demand Guide 330: Guide to On-Demand programming. In some embodiments, this may be combined with the other guides.
 4 Favorites (not shown): list of content selections for user's favorite categories
 5 My VOD (not shown): list of On-Demand content according to selection rules provided by user
 6 My DVR Shows (not shown): list of previously recorded programs Returning to FIG. 2, level two (category related links 220) represents a contextual level of navigation where programming content is ordered according to relevance by content category. The category related links level 220 consists of content categories where the category contextually presented is the one most relevant to the category of content currently being viewed. In one embodiment, the category related links level link 220 navigates the viewer to the 'category application'. The present contextual navigation control provides a method for quickly jumping to the most relevant category based on the currently viewed program. For example, FIG. 4 illustrates an exemplary user interface 400 for selecting category related links, according to one embodiment of the present invention. In this example, if the viewer is currently watching a football game then the 'Sports' category link 420 would be the item shown in the initial state of the contextual navigation control. As a further example, in situations where a viewer is watching a movie, the initial state of the second level 220 of the present contextual navigation control would be 'Movies' 430. Further examples are illustrated Table 1 below.

TABLE 1

| Currently viewed program type | Initial Category Link |
|---|---|
| Football | Sports 420 |
| Movie | Movies 430 |
| Sesame Street | Kids 410 |
| HD program | HD (not shown) |
| Headline News | News (not shown) |

In this manner, the contextual display and dynamic positioning of the relevant links related to a current program, provider, category or genre of same, will assist the viewer to more quickly navigate to the programming they desire. The possible links are also navigable by the viewer once the selection is moved to highlight an element of the present contextual navigation control, as illustrated by FIG. 4. In other words, a viewer may navigate to and select the Kids link 410 or the Movies link 430 upon highlighting the Sports link 420 and in so doing expose further category selections.

Returning to FIG. 2, level three (Channel/Provider Related link 230) represents an additional order of relevance. This level consists of channel specific links where the channel category link contextually presented is the one most relevant to the category of content currently being viewed. This 'programmer category application' can be implemented as a category application or can be any content provided for the current channel or channel family to which this channel belongs. For example, in the examples of FIGS. 3 and 4, the viewer has selected a football game that sets the second level link 220 state to 'Sports' 420 initially.

Figure 5:
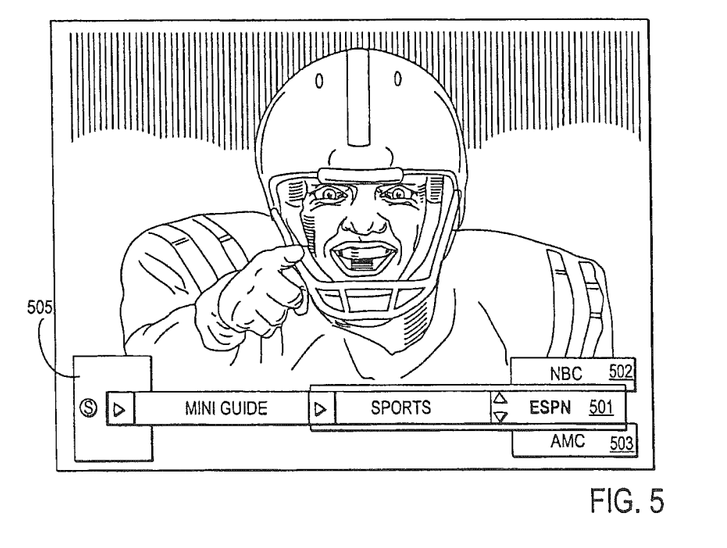
FIG. 5 illustrates an exemplary user interface 505 for selecting channel/provider related links, according to one embodiment of the present invention.

For the purpose of illustrating the third level's relevance (Channel/Provider Related link 230), FIG. 5 illustrates an exemplary user interface 505 for selecting channel/provider related links, according to one embodiment of the present invention. Continuing with the examples shown in FIGS. 3 and 4, FIG. 5 illustrates that the football game is on ESPN. Given that the viewer is watching the football game on ESPN, when the navigation control 505 is launched, the initial state of third level (Channel/Provider Related link 230) will be 'ESPN' 501. This permits the viewer to jump directly to a sports category 501 to see what other sports programming is available on other networks, such as NBC 502, or AMC 503. Additionally, the viewer can jump to a provider category by selecting ESPN 501 to see what other programming and information ESPN is providing. Further examples of relationships between currently viewed channel and the initial option display for the channel/provider link level 230 are shown in Table 2 below.

TABLE 2

| Currently viewed channel | The Initial Channel Link |
|---|---|
| ESPN | ESPN |
| Discovery | Discovery |
| Discovery Wings | Discovery |
| TLC | Discovery |
| Headline News | News |

The 'Discovery' example is provided to illustrate that multiple channels may link to a single channel-family content application. All of the possible links are also navigable by the viewer once the selection is moved to higlhlght this element of the contextual navigation control.

Returning to FIG. 2, level four (Show/Content Related links 240) represents an additional order of relevance. The show/content level 240 consists of program or show specific links where the channel program link (contextually) presented is the one most relevant to the content currently being viewed. For example, if the current program being viewed is the ESPN show "Pardon the Interruption", this link could in one embodiment be an interactive application for "Pardon the Interruption". In one embodiment, the other links available in this level could be interactive applications for programs or shows that share some attribute in common with the current program being viewed.

It will also be apparent that the relationships to categories may be specified in any manner and may contain additional levels of relevance. For instance, in the example of a viewer watching football on ESPN, the first order of relevance was content category (sports), the second order of relevance was the current channel (ESPN), a third order of relevance can be added to be specific to the program. For example if the game were a college game between LSU and Florida then an additional order of relevance might be a link to an application for 'College football' or for 'South-Eastern Conference'.

An Exemplary Network Architecture

Figure 6:
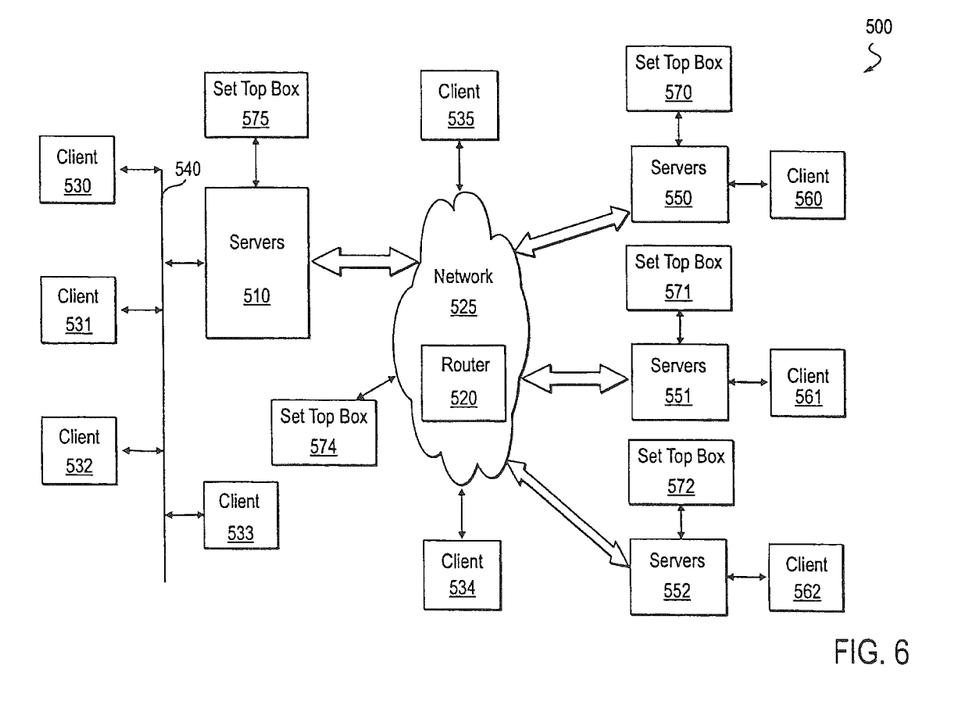
FIG. 6 illustrates an exemplary network architecture, according to one embodiment of the present invention.

Elements of the present invention may be included within a client-server based system 500 such as that illustrated in FIG. 6. According to the embodiment depicted in FIG. 6, one or more servers 510 communicate with a plurality of clients 530-535 and set-top boxes 570-575. The clients and set-top boxes 530-535 and set-top boxes 570-575 may transmit and receive data from servers 510 over a variety of communication media including (but not limited to) a local area network ("LAN") 540 and/or a wide area network ("WAN") 525 (e.g., the Internet). Alternative communication channels such as cable RF and wireless communication via GSM, TDMA, CDMA or satellite broadcast (not shown) are also contemplated within the scope of the present invention.

Servers 510 may include a database for storing various types of data. This may include, for example, specific client data (e.g., user account information and user preferences) and/or more general data. The database on servers 510 in one embodiment runs an instance of a Relational Database Management System (RDBMS), such as Microsoft™ SQL-Server, Oracle™ or the like. A user/client may interact with and receive feedback from servers 510 using various different communication devices and/or protocols. According to one embodiment, a user connects to servers 510 via client software. The client software may include a browser application such as Netscape Navigator™ or Microsoft Internet Explorer™ on the user's personal computer, which communicates to servers 510 via the Hypertext Transfer Protocol (hereinafter "HTTP"). In other embodiments included within the scope of the invention, clients may communicate with servers 510 via cellular phones and pagers (e.g., in which the necessary transaction software is electronic in a microchip), handheld computing devices, and/or touch-tone telephones (or video phones). According to another embodiment, set-top boxes 570-575 connects to servers 510 via a TV application.

Servers 510 may also communicate over a larger network (e.g., network 525) with other servers 550-552. This may include, for example, servers maintained by businesses to host their Web sites—e.g., content servers such as "yahoo.com." Network 525 may include router 520. Router 520 forwards data packets from one local area network (LAN) or wide area network (WAN) to another. Based on routing tables and routing protocols, router 520 reads the network address in each IP packet and makes a decision on how to send if based on the most expedient route. Router 520 works at layer 3 in the protocol stack.

An Exemplary Computer Architecture

Having briefly described an exemplary network architecture which employs various elements of the present invention, a computer system 600 representing exemplary clients 530-535, set-top boxes 570-575 (e.g., set-top box 130) and/or servers (e.g., servers 510), in which elements of the present invention may be implemented will now be described with reference to FIG. 7.

One embodiment of computer system 600 comprises a system bus 620 for communicating information, and a processor 610 coupled to bus 620 for processing information. Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and/or other static storage device 626 coupled to bus 620 for storing static information and instructions used by processor 610.

A data storage device 627 such as a magnetic disk or optical disc and its corresponding drive may also be coupled to computer system 600 for storing information and instructions. Computer system 600 can also be coupled to a second I/O bus 650 via an I/O interface 630. Multiple I/O devices may be coupled to I/O bus 650, including a display device 643, an input device (e.g., an alphanumeric input device 642 and/or a cursor control device 641). For example, video news clips and related information may be presented to the user on the display device 643.

The communication device 640 is for accessing other computers (servers or clients) via a network 525, 540. The communication device 640 may comprise a modem, a network interface card, or other well-known interface device, such as those used for coupling to Ethernet, token ring, or other types of networks.

A contextual navigational control for digital television has been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus comprising:
one or more processors; and
memory storing instructions that, when executed by the one or more processors, cause the apparatus to:
receive, while content is being displayed, a user request to display a guide;
determine, based on the content displayed when the user request was received, a first content category and a second content category, the second content category being a sub-category of the first content category;
generate a menu comprising a plurality of levels arranged from general to specific and wherein a first level of the plurality of levels comprises the first content category and a second level of the plurality of levels comprises the second content category; and
output, for display and overlaid on the content, the menu.

2. The apparatus of claim 1, wherein the content that is being displayed comprises a broadcast program, on-demand content, time-shifted content, or an interactive application.

3. The apparatus of claim 1, wherein the instructions, when executed, cause the apparatus to:
receive, based on the menu, a selection of other content different than the content that is being displayed.

4. The apparatus of claim 1, wherein the first content category corresponds to a program, a channel, a provider, or a genre.

5. The apparatus of claim 1, wherein the first content category corresponds to a same program, a same channel, a same provider, or a same genre as the content that is being displayed.

6. The apparatus of claim 1, wherein the second content category corresponds to one or more channels, providers, shows, or any combination thereof, that are related to the first content category.

7. The apparatus of claim 1, wherein the first content category corresponds to a genre associated with the content that is being displayed and the second content category corresponds to one or more channels, providers, or any combination thereof, associated with the genre.

8. The apparatus of claim 1, wherein the instructions, when executed, cause the apparatus to:
determine that a genre of the content that is being displayed is a sports genre, a movies genre, a kids genre, a high definition (HD) genre, a news genre, or any combination thereof.

9. A computer-readable medium storing instructions that, when executed, cause:
receiving, while content is being displayed, a user request to display a guide;
determining, after receiving the user request and based on the content displayed when the user request was received, a first content category and a second content category, the second content category being a sub-category of the first content category;
generating a menu comprising a plurality of levels arranged from general to specific and wherein a first level of the plurality of levels comprises the first content category and a second level of the plurality of levels comprises the second content category; and
outputting, for display and overlaid on the content, the menu.

10. The computer-readable medium of claim 9, wherein the content that is being displayed comprises a broadcast program, on-demand content, time-shifted content, or an interactive application.

11. The computer-readable medium of claim 9, wherein the instructions, when executed, cause:
receiving, based on the menu, a selection of other content different than the content that is being displayed.

12. The computer-readable medium of claim 9, wherein the first content category corresponds to a program, a channel, a provider, or a genre.

13. The computer-readable medium of claim 9, wherein the first content category corresponds to a same program, a same channel, a same provider, or a same genre as the content that is being displayed.

14. The computer-readable medium of claim 9, wherein the second content category corresponds to one or more channels, providers, shows, or any combination thereof, that are related to the first content category.

15. The computer-readable medium of claim 9, wherein the first content category corresponds to a genre associated with the content that is being displayed and the second content category corresponds to one or more channels, providers, or any combination thereof, associated with the genre.

16. The computer-readable medium of claim 9, wherein the instructions, when executed, cause:
determining that a genre of the content that is being displayed is a sports genre, a movies genre, a kids genre, a high definition (HD) genre, a news genre, or any combination thereof.

17. An apparatus comprising:
one or more processors; and
memory storing instructions that, when executed by the one or more processors, cause the apparatus to:

receive, while content is being displayed, a request to display a guide;

after receiving the request, determine, based on the content displayed when the request was received, a first content category;

output for display the guide overlaid on the content, wherein a first level of the guide displays the first content category; and after receiving a selection corresponding to the first content category:

determine, based on the content that is being displayed, a second content category, wherein the second content category is a sub-category of the first content category;

regenerate the guide to comprise the first level displaying the first content category and a second level displaying the second content category; and output, for display and overlaid on the content, the regenerated guide.

18. The apparatus of claim 17, wherein the selection corresponding to the first content category comprises a selection of a genre.

19. The apparatus of claim 17, wherein the second content category corresponds to one or more providers, channels, or any combination thereof, that correspond to a genre.

20. The apparatus of claim 17, wherein the instructions, when executed, cause the apparatus to:

regenerate the guide with an initial state of the second content category corresponding to a provider or channel of the content that is being displayed.

21. The apparatus of claim 17, wherein the first content category corresponds to a program, a channel, a provider, or a genre.

22. The apparatus of claim 17, wherein the second content category corresponds to one or more channels, providers, or shows that are related to the first content category.

23. A computer-readable medium storing instructions that, when executed, cause:

receiving, while content is being displayed, a request to display a guide;

after receiving the request, determining, based on the content displayed when the request was received, a first content category;

outputting for display the guide overlaid on the content, wherein a first level of the guide displays the first content category; and after receiving a selection corresponding to the first content category:

determining, based on the content that is being displayed, a second content category, wherein the second content category is a sub-category of the first content category;

regenerating the guide to comprise the first level displaying the first content category and a second level displaying the second content category; and outputting, for display and overlaid on the content, the regenerated guide.

24. The computer-readable medium of claim 23, wherein the selection corresponding to the first content category comprises a selection of a genre.

25. The computer-readable medium of claim 23, wherein the second content category corresponds to one or more providers, channels, or any combination thereof, that correspond to a genre.

26. The computer-readable medium of claim 23, wherein the instructions, when executed, cause:

regenerating the guide with an initial state of the second content category corresponding to a provider or channel of the content that is being displayed.

27. The computer-readable medium of claim 23, wherein the first content category corresponds to a program, a channel, a provider, or a genre.

28. The computer-readable medium of claim 23, wherein the second content category corresponds to one or more channels, providers, or shows that are related to the first content category.

* * * * *

UNITED STATES PATENT AND TRADEMARK OFFICE
CERTIFICATE OF CORRECTION

PATENT NO. : 10,848,830 B2
APPLICATION NO. : 15/968160
DATED : November 24, 2020
INVENTOR(S) : Moreau et al.

It is certified that error appears in the above-identified patent and that said Letters Patent is hereby corrected as shown below:

In the Drawings

Figure 7:
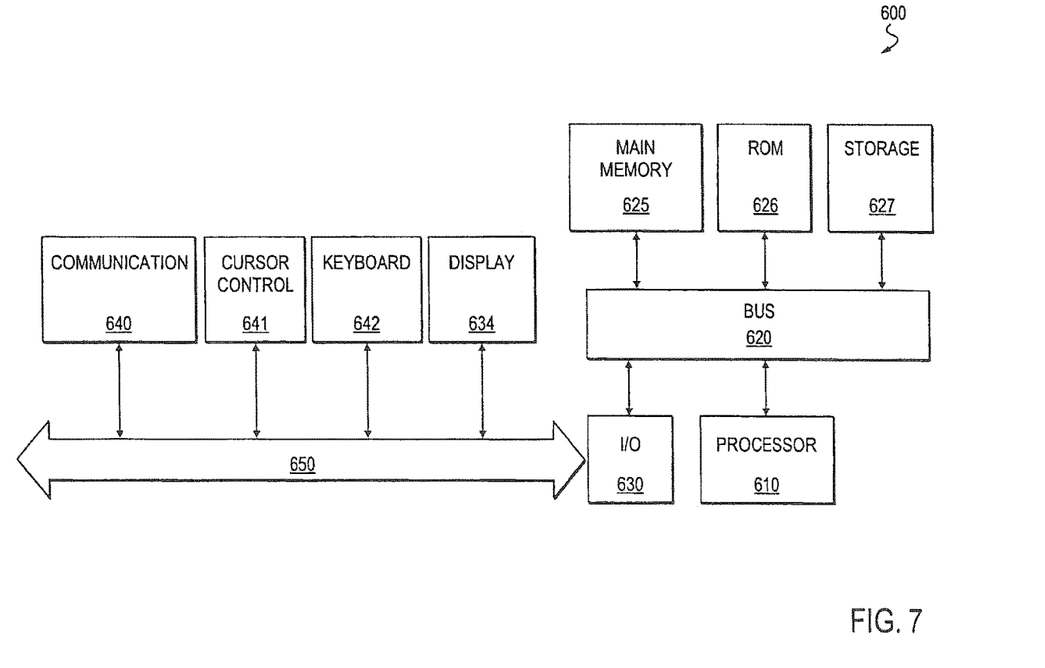
FIG. 7 illustrates an exemplary computer architecture, according to one embodiment of the present invention.

Sheet 7 of 7, Fig. 7, Reference Numeral 634:
Delete "634" and insert --643-- therefor In the Specification Column 7, Detailed Description, Line 49:
Delete "higlhlght" and insert --highlight-- therefor In the Claims Column 12, Claim 23, Line 2:
After "that,", delete "¶"

Signed and Sealed this
Thirty-first Day of January, 2023

*Katherine Kelly Vidal*

Katherine Kelly Vidal
*Director of the United States Patent and Trademark Office*